United States Patent Office 2,739,955
Patented Mar. 27, 1956

2,739,955

COMPOSITIONS OF MATTER AND METHODS AND STEPS OF MAKING AND USING THE SAME

David Wasserman, Irvington, N. J., assignor to The Harvel Corporation, a corporation of New Jersey No Drawing. Application August 23, 1951,
Serial No. 243,372

7 Claims. (Cl. 260—46)

This invention relates to novel products and to methods for producing them and also to novel compositions and articles of manufacture in which one or more of them is a component. In one of its more specific aspects the invention is directed to novel ethers derived from certain starting materials. Each of said starting materials is hereinafter designated as "Product C" and is a resinous organic reaction product produced by reacting an alkenyl phenol, which may be in monomeric or polymeric form and hereinafter designated as "Reactant A" with a phenol-reactive aldehyde and hereinafter designated as "Reactant B." By the term "phenol-reactive aldehyde" as employed herein to define Reactant B, I mean aldehydes as well as aldehyde donors. For improved yields and for increasing the speed of said reaction, it is preferably carried out in the presence of an alkaline or acidic catalyst or condensing agent. Product C may be a thin or heavy liquid or a solid or semi-solid but in all cases is capable of being dissolved in an equal volume of a mixture of 50 parts of toluene to 50 parts of n-butanol.

Heretofore, it was proposed by DeGroote et al. in their U. S. Patent 2,499,365 to react cardanol with formaldehyde to produce a resin which is reacted to produce oxyalkyl ethers thereof. These oxyalkyl ethers are hydrophilic, i. e. self emulsifiable or miscible or soluble in water or self dispersible or have emulsifiable properties.

I have discovered that I may produce hydrophobic ethers of such a resin. My novel ethers are the hydrocarbon ethers of Products C produced by reacting starting material, Product C with a compound hereinafter designated as "Reactant E" to replace the hydrogen atoms of the phenolic hydroxy groups thereof with hydrocarbon radicles. These novel hydrocarbon ethers, hereinafter designated as "Product D" have the unusual property of being non-hydrophilic, water-insoluble, soluble in V. M. and P. naphtha in all proportions, and being capable of being air dried or baked in their film form in the presence of metallic driers to provide dry, hard films having good flexibility characteristics and excellent water, chemical and solvent resistance.

Reactant A is a phenol having on its nucleus an unsaturated hydrocarbon substituent of 14–28 carbon atoms, with the unsaturation due to one or more ethylenic linkage, and said nucleus may or may not be further substituted in one other aldehyde reactive position and in any case has on its nucleus two open aldehyde reactive positions. Said phenol may be in either the monomeric or polymeric state, and in all cases is soluble in an equal volume of 50 parts of toluene and 50 parts of n-butanol. Reactant A may be shown in empirical formula as $(R \cdot C_6H_3OH \cdot X)_n$ in which R is said unsaturated hydrocarbon substituent, $n$ is a whole number of 1 or more and its maximum value is determined by the aforesaid solubility factor and X may be hydrogen or a substituent such as hydroxyl, aryloxy, alkoxy, alkenyl, alkyl, acyl, aryl, acetoxy, aralkyl, halogen, sulfhydryl, carboxy, amino, alkamino, dialkamino, acetamino, methylol, cycloalkyl, carbalkoxy, keto, thio ketone, alkenoxy, acetylene, alkinyl, alkenecarboxy, thiocarboxy, etc. Some of these specific Reactants A are cashew nut shell liquid, either treated or untreated by the methods known to the art for removing the sulphur, metal and nitrogeneous components therefrom and if desired heated to remove from 0–10% by weight of the more readily volatalizable materials therefrom, cardanol, anacardic acid, cardol, 4-amino cardanol, urushiol, bhilawanol, renghol, ginkgolic acid, bilobol, ginkgol, glutarenghol, laccol, thitsiol, Pelandjauic acid, cyclogallipharic acid as well as the polymers of these various phenols.

Some illustrative examples of Reactant B which may be used alone or in combination: aliphatic aldehydes and their self polymers such as formaldehyde, paraformaldehyde, trioxane, acetaldehyde, paraldehyde and higher homologues of acetaldehyde up to twenty carbon atoms; alkenyl aldehydes up to twenty carbon atoms such as acrolein, polyacrolein, methacrolein, crotonaldehyde, citronellal and citral; aromatic aldehydes such as benzaldehyde, naphthaldehyde, salicylaldehyde, ortho-, meta-, or para-tolualdehyde, ortho-, meta, or para-chlorobenzaldehyde, vanillin, ortho-, meta- or parahydroxy or alkoxy benzaldehyde; heterocyclic aldehydes such as furfuraldehyde, methyl furfuraldehyde; polyaldehydes such as glyoxal and phenyl glyoxal, polyglyoxal; aralkylaldehydes such as phenyl acetaldehyde, hydrocinnamaldehyde and cinnamaldehyde; halogen substituted aldehydes such as chloral and bromal; alkoxy, aryloxy, aralkyloxy substituted aliphatic aldehydes; aldehyde donors such as hexamethylene tetramine, methylol or polymethylol derivatives of phenols, cresols and naphthols; also acetals and formals, etc.

Reactant E in general is an organic compound which will react with the phenolic hydroxy groups of the starting material, Product C, to replace the hydrogen atoms of the phenolic hydroxy groups of Product C with a hydrocarbon radical of any number of carbon atoms.

The following are illustrative examples of some of the Reactants E: alkyl halides; alkyl or dialkyl sulfates; alkyl benzene sulfonates; diazomethane; alkenyl halides; aralkyl halides; aralkyl and diaralkyl sulfates; aralkyl benzene sulfonates; cycloalkyl halides; aryl halides. Specific examples of such reagents which are commercially available are methyl chloride, ethyl chloride, 2-ethyl hexyl chloride, lauryl bromide, dimethyl sulphate, diethyl sulphate, ethyl paratoluene sulphonate, allyl chloride, methallyl chloride, benzyl chloride, cyclohexyl chloride, etc.

The novel hydrocarbon ethers of this invention can be used as drying oil upgraders, synthetic drying oils, and resin plasticizers for natural and synthetic rubbers, phenol-formaldehyde type resins. They can be used in varnish, paints and enamel formulations as a partial or total replacement of both resins and drying oils.

A unique and startling property of the novel hydrocarbon ethers of Products C and particularly those of low order of aldehydic condensation, such as dimers, trimers and tetramers, for example, is that they are thin liquids that can be brushed on a surface without any additional thinning with solvents. Surprisingly, such novel hydrocarbon ethers when in the form of thin liquids can be used directly after addition of manganese, lead, cobalt, etc. driers for spray or dipping application as an air dry, or forced air dry at higher temperatures, varnish without the accompanying fire and health hazards that are present when using solvent thinned varnishes, paints, enamels and other synthetic protective coating formulations. For example, the novel hydrocarbon ethers of the cardanol-formaldehyde resins (3:2 mol. eq) of this invention are light amber colored liquids that after addition of driers form pale gold clear films that air dry in 90 minutes, and through which printed letters can be seen without any difficulty. Colors can be differentiated through these varnish films very easily as in the case of different colored lead wires in electrical motors, transformers and other equipment.

The dried coatings of the novel hydrocarbon ethers have excellent flexibility characteristics. This flexibility may, if desired, be increased by internal plasticization in three ways. One, by introducing a saturated long chain alkyl phenol such as the hydrogenated cardanol or wax phenols containing 14–30 carbon atoms in the saturated side chain in place of some of the unsaturated side chain anacardiac type phenol in the alkenyl phenol-aldehyde reactions; two, by introducing a longer chain aldehyde for all or part of the formaldehyde; or three, by increasing the length of the hydrocarbon chain in the ether forming reagent. Alternatively the hardness of these films may be increased by introducing phenol or cresols in place of a fraction of the anacardiaceae type phenols in the alkenyl phenol-aldehyde reaction process, by employing as Reactant E shorter hydrocarbon chain reagents such as dimethyl sulfate or by using between one and two moles of the aldehyde along with increased reaction times and temperatures to yield high viscosity resins.

The novel hydrocarbon ethers of this invention may also be externally plasticized by the addition of blown or unblown non-drying, semi-drying or drying oils such as soya bean, linseed, oiticica, perilla, sardine, tung, cottonseed, dehydrated castor oils, etc.

The novel hydrocarbon ethers of this invention may be added to semi-drying oils to upgrade them by decreasing gelation time, drying time and increase their resistance to salt water, alkali, organic solvents and acids. They may also be co-blown with oxygen or air with the semi-drying and drying fatty oils to give oils with better drying properties.

The novel hydrocarbon ethers of this invention especially those in the lower molecular weight range (less than 1000) can be used as rubber and synthetic rubber plasticizers. The double bonds in their structure can be cross vulcanized, using sulfur and sulfur containing compounds, with unsaturated linkages in the natural and synthetic rubbers. They may also be copolymerized with butadiene, styrene, chloroprene, acrylonitrile, isoprene, or any combination of these in the presence of peroxide, peroxide redox systems, or sodium to give internally plasticized rubbers.

The novel hydrocarbon ethers of this invention are particularly stable to hydrolysis and are distinctively hydrophobic. Since these reactions are substantially complete, as indicated by a modified Gibbs test with 2,6 dibromoquinone imide, the possibility of dermatitis caused by free hydroxyl in the structure is practically removed. Etherification was usually completed to a 99.5% minimum and as much as 99.98% as indicated by the very sensitive (±0.01% sensitivity) Gibbs reagent. Completion of reaction also accomplishes two other things. First I have noticed a marked decrease in color of the reaction mixture as the reaction reached completion and second the drying time was materially shortened as the hydrogen of the phenolic hydroxyl groups was replaced by hydrocarbon radicles. In the presence of metallic driers, the short dry-to-touch time, as short as 90 minutes in air for the higher molecular weight (above 1000) hydrocarbon ethers of this invention, and as much as 180 minutes for the lower molecular weight (about 600–1000) ethers of this invention, was due to complete removal by reaction of the inhibiting free phenolic bodies. Addition of 1% or less free phenols, such as Guai-A-Phene anti-skinning agent, inhibited the drying time noticeably, but did not do so for more than four hours. This prevented skinning of the thinned varnishes after addition of driers. "Guai-A-Phene" is a mixture of phenols obtained by distillation from pine wood.

The following examples are given merely by way of illustrating the invention and are not to be considered in a limiting sense. The various starting materials, Products C, may be best exemplified for the present purpose of illustration by cardanol-formaldehyde reaction products of different viscosities and molecular weights.

The cardanol used in the following examples to obtain light colored oils was a vacuum distilled product that boiled at 180–205° C. at 1 to 2 mm. from a commercial sample of heat extracted cashew nut shell liquid. It had an average of two double bonds in the 15 carbon straight chain in the meta position to the phenolic hydroxyl group and was of the following formula:

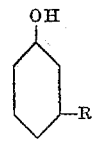

in which R is a normal olefinic substituent of 15 carbon atoms.

*Example 1* a. Low molecular weight cardanol-formaldehyde resin:

1200 grams (4 moles) cardanol
216 grams (2.68 moles) formaldehyde 37%
20 grams ammonia (concentrated aqueous)

Into a 5 liter 3-neck flask equipped with stirrer, addition funnel and reflux condenser was added the cardanol, formaldehyde and then ammonia. After refluxing for 1.5 hours, the reaction mass was dehydrated under a vacuum of 20 millimeters of mercury and bodied by heating slowly to 130° C. to provide Product CI, having a viscosity on the fluidmeter at 130° F. of 16.5 cm./minute.

b. Ethyl ether of low molecular weight cardanol formaldehyde resin:

| | |
|---|---|
| NaOH (1) | 41.5 grams in 40 grams water (3.0 moles) |
| NaOH (2) | 41.5 grams in 40 grams water (3.0 moles) |
| NaOH (3) | 41.5 grams in 40 grams water (3.0 moles) |
| NaOH (4) | 16.0 grams in 16 grams water |
| Diethyl sulfate (a) | 108 grams (0.7 m.) |
| Diethyl sulfate (b) | 108 grams (0.7 m.) |
| Diethyl sulfate (c) | 92.5 grams (0.6 m.) |
| Diethyl sulfate (d) | 124 grams (0.8 m.) |
| Toluol | 300 grams |
| Xylol | 600 grams |

620 grams of Product CI was diluted with 300 grams of toluol and 600 grams of xylol and then NaOH solution (1) was added with stirring. Diethyl sulfate (a) was added keeping the temperature below 40° C. and then the temperature was brought up to 80° C. for one hour. After the temperature was reduced to 40° C., NaOH (2) was added and then at 40° C. diethyl sulfate (b) was added. The temperature was raised to 80° C. and kept there one hour. After reducing the temperature to 40° C., NaOH (3) was added and the water removed using a Dean and Stark water separator at reflux temperature of toluol. After removal of 160 cc. of water, diethyl sulfate (c) was added and heated to 90° C. A modification of Gibbs test for phenols with dibromoquinoneimide indicated free phenolic hydroxyl. Diethyl sulfate (d) was added and after heating to 110° C. for 2 hours, became acidic. NaOH (4) was added, dehydrated and heated ½ hour at 110° C. Test indicated 99.5% of phenolic hydroxyls etherified. This was washed with two 600 cc. portions of hot water at a pH below 6 to avoid emulsions. The remaining product was neutralized to pH 7.5–8 and dehydrated in vacuo. The resultant amber colored liquid, Product DI, had a viscosity of 32.0 cm. at 130° F. on the fluidmeter. Molecular weight by the Menzies method was 910. Drying time of a film from the following composition:

10 grams ethyl ether of cardanol-formaldehyde resin (Product DI)
0.125 gram lead naphthenate (16% lead)
0.25 gram manganese naphthenate (6.0% manganese)
10 grams V. M. and P. naphtha was dust free and dry to touch after three hours. The same composition formed solvent and chemical resistant films at 300° F.

The ethers of cardanol-formaldehyde resins, as, for example, Product DI, do not have the dermatitis producing property usually associated with products obtained from the anacardiaceae family of plants.

*Example II.—Allyl ether of low molecular weight cardanol-formaldehyde resin. (Molecular weight around 900)*

| Cardanol formaldehyde resin (Product CI of Example I) | 314 grams (1.0 m.) |
| --- | --- |
| Ethanol 95% | 500 cc. |
| Butanol | 100 cc. |
| Potassium hydroxide (1) | 61 grams (1.1 moles) in 150 cc. ethanol 95% |
| Potassium hydroxide (2) | 5.6 grams (0.1 mole) in 20 cc. ethanol |
| Allyl chloride | 90 grams (1.2 m.) |
| Diethyl sulfate | 15.4 grams (0.1 m.) |

Into a 2-liter 3-neck flask equipped with stirrer, dropping funnel and reflux condenser was added the cardanol formaldehyde resin Product CI, ethanol, butanol and alcoholic potassium hydroxide (1) with stirring in that order. After addition of the allyl chloride the solution was refluxed 22 hours. pH at the end of this period was 8. Potassium hydroxide solution (2) and then the diethyl sulfate were added to the cooled solution at 30–40° C. and then refluxing was continued 3 hours. The ethanol (500 cc.) was distilled and the remaining butanol solution washed three times with 300 cc. portions of hot water. The butanol and water were removed in vacuo by heating to 100° C. at 20 mm. pressure to provide Product DII. Modified Gibbs test indicated 99.5% completion of etherification. The novel Product DII had a viscosity of 5.5 seconds Gardner-Holt tube at 25° C. and was an amber colored clear liquid.

Various varnishes may be made with Product DII and various driers may be employed therewith. Manganese naphthenate and cobalt naphthenate gave the best results as individual driers. Copper and lead naphthenate were slower. A particular varnish made up as follows gave a drying time at 25° C. to touch of two hours on glass panels.

10 grams allyl ether of cardanol-formaldehyde resin (Product DII)
0.18 grams manganese naphthenate (6%)
0.18 grams lead naphthenate (16%)
0.09 grams cobalt naphthenate (6%)
10 grams V. M. and P. naphtha A high gloss, clear film that became more resistant to chemicals and solvents after two to three weeks of aging was obtained.

Product DII has excellent baking properties. For example, the allyl ether of cardanol-formaldehyde resin Product DII, on standing at 105° C. overnight without driers formed a tough clear film.

Baking films of Products DII in combination with driers as above at 300° F. gave a wrinkle finish in 10 minutes. Very thin films did not wrinkle. Films baked for ½ hour or more at 300° F. were resistant to concentrated sulfuric acid, concentrated nitric acid, acetone, chloroform, ethyl acetate, dioxane, acetic acid, ethanol, butanol, toluol, mineral spirits, and 5% aqueous sodium hydroxide without any visible damage except for a slight darkening with the concentrated sulfuric and nitric acids.

*Example III.—Ethyl ether of heavy bodied cardanol-formaldehyde resin* a. Heavy bodied cardanol-formaldehyde resin:

1200 grams (4 moles) cardanol
390 grams (4.8 moles) formalin 37%
20 grams ammonia 28%
1200 grams xylol Into a 5-liter three-neck flask equipped with stirrer, reflux condenser and thermometer was added the cardanol, formaldehyde and ammonia with stirring. This was refluxed two hours, then after adjusting the condenser for vacuum distillation the reaction mixture was dehydrated at 20 mm. pressure. The temperature of the mixture increased to 120° C. over a period of 3.5 hours and the viscosity measured on the fluidmeter at 130° F. was 2.2 cm. This product is Product CII. The xylol was added with stirring to prevent gel formation.

b. Ethyl ether of heavy bodied cardanol-formaldehyde resin:

156 grams (0.05 moles in 150 grams xylol) cardanol-formaldehyde heavy bodied resin (Product CII in xylol)
16 grams (0.4 mole) (1) NaOH in 16 grams of water
12 grams (0.3 moles) (2) NaOH in 12 grams of water
34 grams (0.85 moles) (3) NaOH in 34 grams of water
62 grams (0.4 moles) (a) diethyl sulfate
45 grams (0.3 moles) (b) diethyl sulfate
22.5 grams (0.15 moles) (c) diethyl sulfate
150 cc. butanol The cardanol-formaldehyde resin Product CII in solution with xylol, butanol and sodium hydroxide solution (1) were added slowly in that order with stirring to a one-liter 3-neck flask equipped with stirring, dropping funnel and still head and condenser set up for distillation. The diethyl sulfate (a) was added at 30° C. and the temperature after the initial rise was raised to 90° C. and kept at this point one hour. The temperature was lowered to 30° C. and alkali (2) was added. The water and xylol was removed by distillation and the xylol replaced by an equal volume of dry xylol. Diethyl sulfate (b) was added at 50° C. and the temperature raised to 90° C. and kept there by means of a Glas-col electric heater for 17 hours. The reaction mixture turned acid and was neutralized with alkali solution (3). The mass was dehydrated under vacuum, the xylol being replaced continuously with dry xylol. Diethyl sulfate solution (c) was added at 50° C. and after the initial rise increased to 90° C. and kept there one hour. Modified Gibbs test indicated 99.9% completion of etherification. The reaction mixture was made acid with dilute sulfuric acid, washed three times with 100 cc. portions of hot water and dehydrated under vacuum. The resultant novel product, Product DIII had a viscosity on the fluidmeter of 16.5 cm./130° F./1 minute and molecular weight of about 2000 by the Menzies method.

A varnish made up as follows dried to touch in 80 minutes:

22 grams ethyl ether of heavy bodied cardanol-formaldehyde resin (Product DIII)
0.55 grams manganese naphthenate (Nuodex—6% manganese)
0.28 grams lead naphthenate (Nuodex—6% lead)
0.18 grams cobalt naphthenate (Nuodex—6% cobalt)

Clear, hard, high gloss, pale gold films were obtained on glass, wood, or tin. Baked hard and dry at 150–160° F. in six hours. A film on a glass panel baked at 300° F. ½ hour gave a clear smooth, high gloss film that resisted concentrated sulfuric acid, concentrated nitric acid, chloroform, acetic acid, toluol, acetone, benzene, xylol, heptane, butyl carbitol, dioxane, ethyl acetate, ethanol, methanol. The test was addition of one drop of the above liquids, kept covered in the case of volatile solvents, on the film for five minutes. There was no apparent cracking, lifting, blistering or break in the continuity of the film. The acids did darken the film to a reddish-orange color but did not break the film surface.

A wood panel coated with two separately dried layers of the varnish and air dried one week showed no signs of change after pouring boiling water on the panel continuously for one minute.

A ½-mil coating of Product DIII above on tin plate after drying will withstand a 180° bend on a ¼" mandrel without cracking.

*Example IV.—Allyl ether of heavy bodied cardanol-formaldehyde resin*

157 grams (0.5 mole) heavy bodied cardanol-formaldehyde resin (Product CII)
250 cc. butanol
28 grams (0.5 mole) potassium hydroxide (dissolved in 75 cc. ethanol) (1)
19.6 grams (0.35 mole) potassium hydroxide (dissolved in 50 cc. ethanol) (2)
2.8 grams (0.05 mole) potassium hydroxide (dissolved in 10 cc. ethanol) (3)
38.2 grams (0.5 mole) allyl chloride (a)
26.8 grams (0.35 mole) allyl chloride (b)
7.7 grams (0.1 mole) diethyl sulfate The cardanol-formaldehyde resin, Product CII, was placed in a two-liter three-neck flask, butanol, potassium hydroxide (1) and then allyl chloride (a) in that order with stirring. The mixture was refluxed three hours, cooled and potassium hydroxide then allyl chloride (a) added at 30° C. The reaction mixture was refluxed 17 hours. After cooling the mixture potassium hydroxide (3) and then the diethyl sulfate were added at 30° C. This was then heated slowly to reflux temperature and refluxed two hours. A sample washed, dried and tested by the modified Gibbs method indicated 99.7% completion of etherification. The clear amber liquid was washed three times with 300 cc. portions of hot water and the butanol, ethanol and water removed under vacuum, to provide a novel product, Product DIV having a viscosity of 31 cm./130° F./1 min. on the fluidmeter.

A varnish made up as follows dried in 90–100 minutes at 25° C.:

10 grams allyl ether of heavy bodied cardanol-formaldehyde resin, Product DIV
0.18 gram manganese naphthenate (Nuodex)
0.18 gram lead naphthenate (Nuodex)
0.09 gram cobalt naphthenate
10 grams V. M. and P. naphtha yields a clear light gold, high gloss, tough, smooth film.
The same varnish when heated at 300° F. will give a uniform wrinkle finish. This occurs in thick films of one mil or more even at 150–160° F. Then films of less than 0.5 mil in thickness will bake smooth at 150–300° F.

*Example V.—Copolymerization of ethyl ether of heavy bodied cardanol-formaldehyde resin, Product DIII, with refined linseed oil*

A comparison was made between the up-grading of linseed oil with Product DIII and allyl sucrose. Since a marked effect occurred in 30% concentration of up-grader, as shown in Example VI, this was used with linseed oil.

K. 20 grams of linseed oil,
L. 6 grams allyl sucrose and 14 grams linseed oil, and
M. 6 grams Product DIII and 14 grams linseed oil were placed in three separate test tubes and oxygen bubbled through capillary tubes into the contents heated at 100° C. at a rate of 180 cc. per minute. The viscosity changes with time are indicated below.

| | Viscosity, Gardner-Holt, 25° C. | | Viscosity, Fluidmeter 130° F./1 min. | | |
|---|---|---|---|---|---|
| | 0 hours | 6 hours | 8 hours | 10 hours | 11 hours |
| K | 1–2 sec | 12 sec | 25.7 cm | 15.5 cm | stopped. |
| L | 1–2 sec | 12 sec | 29.5 cm | 20.5 cm | 18.0 cm. |
| M | 1–2 sec | 20.2 sec | 18.7 cm | Stopped | |

The viscosity increase of the Product DIII and linseed oil was greater than linseed oil fortified with allyl sucrose, a commercial semi-drying oil up-grader.

The drying time of the three blown samples K, L and M was obtained by cutting them with an equal weight of V. M. and P. naphtha, adding 1.7% cobalt naphthenate (Nuodex 6% solution) by weight and brushing a film on a tin panel. After 150 minutes sample M was dry and tack free, sample L was still tacky, and K was slightly tacky. Thus Product DIII also speeds up the rate of drying of blown linseed oil.

*Example VI.—Up-grading of soya bean oil with the ethyl ether of heavy bodied cardanol formaldehyde resin Product DIII* a. Effect of concentration of up-grader:
Samples of soya bean oil and soya bean oil-ethyl ether resin (Product DIII) were copolymerized by blowing with oxygen using the same method as set forth in Example V. The rate of viscosity increase with time is indicated in the chart below:

| | Viscosity, Gardner-Holt tubes, 25° C. | | |
|---|---|---|---|
| | Initial | 6 hours | 8 hours |
| | Sec. | Sec. | Sec. |
| P. 100% Soya bean oil | 1.0 | 6 | 12.0 |
| Q. 90% S. B. oil, 10% Product DIII | 1.6 | 9 | 15.0 |
| R. 80% S. B. oil, 20% Product DIII | 2.0 | 13 | 24.2 |
| S. 70% S. B. oil, 30% Product DIII | 2.0 | 24 | 112.0 |

The great increase between 20% up-grader and 30% up-grader indicates that 30% should be used to give the greater effect per percent concentration.

The thus bodied samples P, Q, R and S when diluted with an equal weight of toluol and 0.1% by weight of cobalt metal as the 6% naphthenate solution was added showed the following drying on 18 hour drying at room temperature of a film on tin plate:

S _____ dry
R _____ slightly tacky
Q _____ tacky
P _____ most tacky to touch

Thus the resin ethyl ether, Product DIII, can up-grade soyabean oil so that it dries over night without the addition of solid resins which require heating to obtain solution.

The fluidmeter employed is an instrument used to measure the viscosity of varnish resins at 130° F. About 1 cc. of fluid is placed in a hemispherical indentation on the upper face of the instrument while in a horizontal position and permitted to come to 130° F in two minutes. The rectangular box-like instrument is up-ended to a vertical position and the fluid flows downward into a channel ¼ inch deep and ⅜ inch wide that is marked off in centimeters. The distance of flow in one minute is a measure of the relative viscosity of the oil.

Of course various other starting materials, Products C, and Reactants E besides those specifically set forth in the examples, may be used to provide other specific Products D. The various other Products C may be produced by following the general method described herein for producing Products CI and CII and by employing other phenol-reactive aldehydes and/or other of said alkenyl phenols in place of cardanol. There are many examples known to the art of resins as defined by Product C herein, such as resinous reaction products of cashew nut shell liquid, cardol, cardanol, anacardic acid, etc. with formaldehyde, paraformaldehyde, hexamethylene tetramine, furfural, acetaldehyde, etc.

Having thus described my invention, what I claim is:

1. A novel product being a hydrocarbon ether of a resinous reaction product of a phenol-reactive aldehyde and a material selected from the group consisting of alkenyl phenols and their polymer soluble in an equal volume of a solvent consisting of 50 parts of toluene and 50 parts of n-butanol, each of said alkenyl phenols having at least 2 positions on its nucleus open to aldehyde reaction and having an olefinic substituent of 14-28 carbon atoms on its nucleus, said resinous reaction product being soluble in an equal volume of said solvent, said ether being hydrophobic and soluble in all proportions in V. M. and P. naphtha, and capable of air drying.

2. A product as defined in claim 1, said ether being an alkyl ether.

3. A product as defined in claim 1, said ether being an alkenyl ether.

4. A product as defined in claim 1, said ether being an aryl ether.

5. A hydrocarbon ether of a cardanol-aldehyde resinous reaction product, said resinous reaction product being soluble in an equal volume of a solvent consisting of 50 parts of toluene and 50 parts of n-butanol, said ether being capable of being air dried.

6. A hydrocarbon ether of a cashew nut shell liquid-aldehyde resinous reaction product being soluble in an equal volume of a solvent consisting of 50 parts of toluene and 50 parts of n-butanol, said ether being capable of being air dried.

7. The method for producing a novel hydrocarbon ether comprising under alkaline conditions reacting (a) a hydrocarbon ester selected from the group consisting of sulfonates, sulfates and halides with (B) a resinous reaction product of a phenol-reactive aldehyde and a material selected from the group consisting of alkenyl phenols, and their polymers, soluble in an equal volume of a solvent consisting of 50 parts of toluene and 50 parts of n-butanol, each of said phenols having at least 2 positions on its nucleus open to aldehyde reaction and having olefinic substituent of 14-28 carbon atoms on its nucleus, said resinous reaction product being soluble in an equal volume of said solvent, to provide an ether which is hydrophobic, soluble in all proportions in V. M. and P. naphtha, and air dryable.

References Cited in the file of this patent

UNITED STATES PATENTS

| | | |
|---|---|---|
| 2,067,919 | Harvey | Jan. 19, 1937 |
| 2,143,880 | Hughes | Jan. 17, 1939 |
| 2,181,119 | Caplan | Nov. 28, 1939 |
| 2,317,585 | Caplan | Apr. 27, 1943 |
| 2,317,587 | Caplan | Apr. 27, 1943 |
| 2,460,256 | Harvey | Jan. 25, 1949 |